Feb. 24, 1953 M. J. PIFER 2,629,604

DOUBLE GATE PUSH-OFF SPINDLE FOR PHONOGRAPHS

Filed April 21, 1949

INVENTOR.
Marion J. Pifer
BY A. B. Richardson
ATTORNEY

Patented Feb. 24, 1953 2,629,604

UNITED STATES PATENT OFFICE 2,629,604

DOUBLE GATE PUSH-OFF SPINDLE FOR PHONOGRAPHS

Marion J. Pifer, Williamsville, N. Y., assignor, by mesne assignments, to Sylvania Electric Products Inc., New York, N. Y., a corporation of Massachusetts Application April 21, 1949, Serial No. 88,826

15 Claims. (Cl. 274—10)

Figures 1, 2, 3, 4, 5, 6, 7:
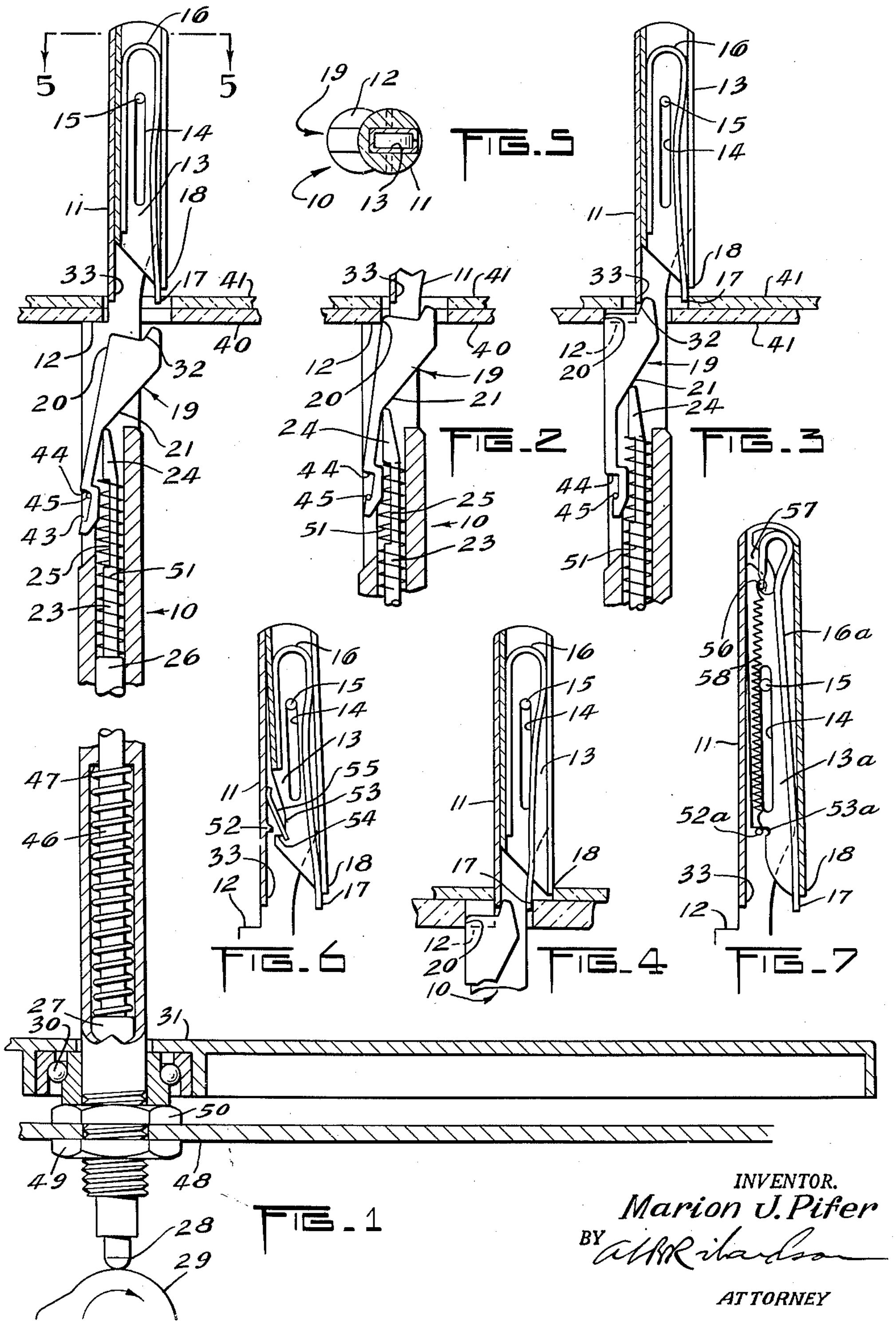

This invention relates to a spindle for automatic record changing phonographs, and more particularly, to a spindle of the center post drop push-off type, wherein the records rest on a shoulder engaging the lowest record of the stack at the center, and are dropped one at a time to the turntable by mechanism within the spindle, which pushes the lowest record laterally until the center hole of the record registers with the spindle, whereupon the record drops to the turntable and the remaining records drop down the thickness of the displaced record to bring the next lowest record in position to be dropped.

The present application is a continuation in part of application Serial No. 26,208, filed May 10, 1948, now abandoned, entitled Double Gate Push-Off Spindle for Phonographs, and assigned to the same assignee as the present application.

Many spindles of this type have been proposed, but as far as I know, none of them are entirely satisfactory. One of the important reasons for this is the variation in record thickness. Commercially available records may vary in thickness from as little as .050″ to as much as .130″. If records with such variations are attempted to be played on machines with presently available types of spindles, it will be found that where two thin records happen to be next to each other, the machine will drop both records at once, instead of one at a time. If a thick record is encountered, it is likely to be chipped at the center, and in a short time becomes unplayable.

These difficulties make it necessary, as a practical matter, for the user to discard thick or thin records when satisfactory automatic operation is desired.

It is an object of this invention to eliminate these defects and to provide a spindle which has a wide tolerance to variations of record thickness, so as to permit the automatic playing of commercially available records varying in thickness, without the likelihood of the machine dropping two thin records at a time, or of chipping the center hole of thick records.

It is a further object of this invention to provide such a spindle which involves only very simple mechanism, easy to manufacture, install, and operate, and one which does not require the machining of parts to extremely close tolerances.

It is a further object of this invention to provide such a spindle which is rugged and durable, and unlikely to be made inoperative by wear.

Still other objects and advantages of my invention will be apparent from the specification.

The features of novelty which I believe to be characteristic of my invention are set forth with particularity in the appended claims. My invention itself, however, both as to its foundamental principles and as to its particular embodiments, will best be understood by reference to the specification and accompanying drawing, in which Figure 1 is a sectional elevation of a spindle in accordance with my invention, showing two thin records in position on the spindle; Figure 2 is a fragmentary sectional view of the record dropping mechanism like Figure 1, but showing the push-off finger about to engage and push off the bottom record; Figure 3 is a similar view with the push-off finger at the end of its travel, with the bottom record now at the start of its drop; Figure 4 is a similar view showing the action of the double gate with a thick record in position to drop; Figure 5 is a section on lines 5—5 of Figure 1; and Figures 6 and 7 illustrate modified forms of the invention.

Referring now more particularly to Figure 1, 10 designates the spindle having an offset top portion 11 and a shoulder 12 on which the records rest. The top portion of the spindle is provided with a longitudinal slot within which there is mounted the sliding gate 13, in this instance formed of a sheet of material bent to rectangular shape as more particularly shown in Figure 5. This gate is free to slide upwardly and downwardly in the offset portion 13 of the spindle, but the limits of its movement are fixed by slot 14 which engages pin 15 extending through the spindle. The lower portion of the sliding gate 13 in this embodiment of the invention is cut diagonally so that the outermost side of the gate is its lowest point 18. Within the gate I provide a spring 16 generally of hairpin shape having its lower front portion 17 extending slightly below the lower front portion 18 of the gate 13.

When the records are placed on the spindle they take the position shown in Figure 1, with the bottom side of the lowest record resting on shoulder 12 and the other records stacked above the lowest record. If it is desired to lift off the records from this position, they may simply be lifted up, and if the gate happens to be in the way, as in Figure 3, it is slid upwardly by engagement with the records until the outwardly flaring wall of the offset portion of the spindle engages and pushes the record clear, at which time the gate 13 drops back to the position shown in Figure 1.

In order to play the bottom record, it is engaged at the center hole by the push-off finger 19, and pushed laterally to the left for instance to the left in Figure 1, until it clears the shoulder 12, at which time the spindle is clear and the record will drop to the turntable 31. The push-off finger 19 has a face 20 which engages the left hand wall of the center opening of the record 40 and moves it to the left, and a cam surface 21. The finger 19 has a lower notch portion with shoulders 43 and 44 defining the lower and upper ends of the notch respectively, and these shoulders engage a pin 45 mounted in the spindle. The spindle is hollow to receive actuating plunger 23 provided at its upper end with finger 24 to engage the cam surface 21 of the push-off finger 19, and the plunger 23 is undercut as at 25 for a purpose which will be explained hereafter. The plunger 23 has a lower portion 26 of larger diameter which fits within the upper barrel of spindle 10 and spring 51 surrounds the upper portion of the plunger 23 as shown. The lower portion of the spindle is provided with a still larger portion 27 and the plunger return spring 46 surrounds the plunger and bears at its upper end against a web portion 47. The turntable is mounted on suitable bearings 30 and provided with a slight clearance from the spindle 10, as it will be understood that the spindle does not rotate, but is secured to chassis plate 48 as for instance by suitable nuts 49 and 50.

Operation of the mechanism will now be described. As cam 29 rotates clockwise as shown in Figure 1, the follower 28 at the bottom of plunger 23 is lifted, raising the plunger. The upper end of the plunger pushing against the lower cam portion 21 of finger 19, lifts the push-off finger with a slight counterclockwise rotation. Further rotation during this preliminary lifting operation is prevented by action of spring 51 against which the lower portion of finger 19 presses, so that the finger is lifted, substantially vertically until the lower shoulder 43 engages against pin 45 as shown in Figure 2. When this occurs, continued upward motion of the plunger 23 causes the finger 19 to pivot around pin 45, rotating counterclockwise, engaging the lower record, and pushing it to the left to the position shown in Figure 3, where it is ready to drop, at which time the projection 32 engages the back portion 33 of the upper part 11 of the spindle, preventing further forward motion of the push-off finger. The bottom record 40 will now drop to the turntable, and the next record 41 will become the bottom record. At this time, continued rotation of the cam 29 permits the plunger 23 to return to its inactive position as shown in Figure 1, under the pressure of plunger restoring spring 46. During this action, it will be observed that the lower gate 17 has engaged the right hand side of the center hole of record 41 and has prevented that record from moving with record 40.

Should the bottom record 40 be thick, the double gate acts as shown in Figure 4. The lower record is now of sufficient thickness to engage the lower gate 17 which is the lower end of spring 16. Pressure by the push-off finger bends spring 16, allowing lower gate 17 to move inwardly a sufficient distance to permit the record to clear the shoulder 12 and drop, after which the lower gate springs back into position.

In order for the operation above described to take place, certain relations should obtain between the dimensions of the gate and the strength of the various springs. In the embodiment of the invention herein disclosed, the vertical distance from shoulder 12 to the bottom of the lower gate 17 is made .090'' and the distance between the lower end of lower gate 17 and the lower end of the upper gate 18 is made .045''. The distance between the shoulder 12 and the lower side of the upper gate 18 is, therefore, .135''. The distance by which the push-off face 20 of push-off finger 19 extends above the level of shoulder 12 is made less than the thinnest record, so that under no circumstances will the push-off finger push on two records simultaneously.

The spring 16 is chosen to require a pressure of about 8 ounces to deflect to the position of Figure 4. With only two records in position on the shoulder, the spring 16 is required to exert a maximum pressure of between 4 and 5 ounces to hold the top record while the bottom record is being slid to dropping position. As additional records are added on the spindle, only slightly additional pressure is required because the third and all higher records are held by the rigid or upper section 18 of the gate. When a thick record is being pushed to dropping position, the force required to push it is increased by the force required to deflect the lower gate 17, and the normal pressure of about 2 pounds required to push a record to dropping position is increased by the pressure required to deflect the lower gate 17. I have referred to the spring 16 as requiring a pressure of 8 ounces to deflect, but because only 5 ounces is required to hold the second record in position, in order to avoid close inspection of the springs for production, it may be desirable to use a stronger spring requiring two to three times this pressure, that is a pressure of 16 or 24 ounces.

From the foregoing it will be seen that when the push-off finger engages the bottom record, the bottom record is thick enough to strike the lower gate 17, the pressure of the push-off finger against the record is sufficient to deflect the bottom gate. When, however, the bottom record does not engate the lower gate, the only force tending to push the next to bottom record off is that transmitted by friction from the bottom record to the next to bottom record, and the force required to deflect the lower gate 17 is chosen greater than the force which can be transmitted between the two records by friction.

Figure 6 illustrates a modified form of the invention particularly effective to minimize the undesirable dropping of the lowermost two records of a stack as may occur when using records having center holes with edges which have been rounded by chipping or the like. Such records when used with the spindle structure hereinbefore described are apt to exert a wedging action under the lower end of the lower gate 17 and move the entire gate structure upwardly so that the two lowermost records undesirably drop together. In the modified structure of Figure 6, a latch is provided for preventing any longitudinal movement of the gate structure upon the occurrence of any lateral pressure exerted by a record on the gate. To this end, the offset top portion 11 of the spindle is provided with an internal fixed stop 52 and a notch 53 is formed in the sliding gate 13 to provide a stop 54 positioned in cooperative relation with the stop 52. The stops 52 and 54 normally are biased by a spring member 55 to unlatched position to permit longitudinal movement of the gate when it is desired to remove one or more records from the turntable 31. Only slight clearance is provided between the stops 52 and 54 for this purpose, however, and the spring member 55 exerts such light force that the biasing of the stops laterally apart to a disengaged position occurs only in the absence of any lateral pressure exerted by a record on the lower gate 17 or upper gate 18. Thus, lateral pressure of a record on the lower end of the gate structure moves the gate into a latched position where the stops 52 and 54 engage, and the gate is thereupon prevented from moving longitudinally upward. The worn or rounded edge of the center hole of a record consequently is not able to cause any longitudinal movement of the gate with the result that only the lowermost record of a stack is dropped into playing position on the turntable 31 in the manner previously described.

Figure 7 illustrates an additionally modified form of the invention essentially similar to that of Figure 6, elements of Figure 7 corresponding to similar elements of Figure 6 being designated by similar reference numerals and analogous elements by similar reference numerals with a subscript. In the present structure, the fixed stop $52_a$ comprises a pin secured at its ends in apertures provided in the portion 11 of the spindle and the upper gate $13_a$ has a rounded lower end terminating in the rounded notch $53_a$ having a radius corresponding to that of the pin $52_a$. The spring $16_a$ is somewhat shortened and terminates at its upper end 56 in a T-shaped configuration, the arms of the T engaging individual ones of a pair of hooked slots 57 formed in opposite walls of the sliding gate $13_a$. One end of a helical spring 58 hooks over the end 56 of the spring $16_a$ and the other end of the spring is secured to the pin $52_a$ to spring-bias the gate structure in a downward direction into engagement with the pin $52_a$. At the same time, the spring 58 slightly rotates the gate structure about the pin 15 to maintain the notch $53_a$ of the upper gate $13_a$ slightly out of engagement with the pin $52_a$. For clarity of illustration, the notch $53_a$ is shown displaced a substantial distance from the pin $52_a$, but in practice the notch and pin are normally separated only by a few thousandths of an inch so that only slight lateral pressure of a record on the gate structure will suffice to engage the notch and pin and latch the gate structure against longitudinal movement in an upward direction. The operation of the present modified form of the invention is otherwise essentially similar to that described in connection with the Fig. 6 form of the invention.

In the specification I have explained the principles of my invention and the best mode in which I have contemplated applying those principles, so as to distinguish my invention from other inventions, and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A center post drop spindle of the push-off type for automatic record changers, comprising, in combination, a bottom portion terminating in a record-supporting shoulder, a push-off finger positioned within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being yieldable inwardly in response to predetermined pressure.

2. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being resiliently yieldable inwardly in response to predetermined pressure.

3. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being yieldable inwardly only in response to pressure in excess of that required to slide one record over another.

4. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being resiliently yieldable inwardly only in response to pressure in excess of that required to slide one record over another.

5. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and a second portion extending below the bottom of said upper gate portion in the direction of said shoulder yet terminating short thereof by a distance slightly greater than the thickness of the thinnest record to be used with said spindle, said second portion being yieldable inwardly in response to predetermined pressure and the lowest point of said upper gate portion being at least 0.125″ vertically spaced from said shoulder.

6. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and a second portion extending below the bottom of said upper gate portion and yieldable inwardly in response to predetermined pressure, the lowest point of said upper gate portion being at least 0.125″ vertically spaced from said shoulder, and the lowest point of said lower gate portion extending below the lowest point of said upper gate portion by a distance of the order of one third that of the vertical spacing between said shoulder and the lowest point of said upper gate portion.

7. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being yieldable inwardly in response to predetermined pressure, said upper gate portion being in the form of a sleeve, and said lower gate portion being mounted within said sleeve.

8. A center post drop spindle of the push-off type for automatic record changers, comprising, in combination, a bottom portion terminating in a record-supporting shoulder, a push-off finger mounted within said bottom portion adjacent said shoulder and mounted for translation and partial rotation to engage the wall of the center hole of a record and push it laterally to clear said shoulder, and an upper spindle portion having a gate therein, said gate having an upper portion fixed against substantial inward motion and terminating short of the plane of said shoulder by a distance slightly greater than the thickness of the thickest record to be used with said spindle and a second portion extending below the bottom of said upper gate portion in the direction of said shoulder but terminating short of the plane of said shoulder by a distance slightly greater than the thickness of the thinnest record to be used with said spindle, said second portion being yieldable inwardly in response to predetermined pressure, said upper gate portion being in the form of a sleeve, and said lower gate portion being a spring mounted within said sleeve and having its end projecting below said sleeve.

9. A center post drop spindle of the push-off type for automatic record changers comprising, a bottom spindle portion terminating at its upper end in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle portion including a gate normally positioned adjacent said shoulder for restraining lateral movement of any record other than the lowest record of a stack thereof resting on said shoulder, said gate being movable longitudinally of said spindle and in a direction toward the upper end thereof to facilitate removal of records from said spindle, and a spindle latch structure positioned between said upper spindle portion and said gate for preventing said longitudinal movement of said gate upon the occurrence of any lateral pressure exerted by a record on said gate.

10. A center post drop spindle of the push-off type for automatic record changers comprising, a bottom spindle portion terminating at its upper end in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle portion including a gate normally positioned adjacent said shoulder for restraining lateral movement of any record other than the lowest record of a stack thereof resting on said shoulder, said gate being movable longitudinally of said spindle and in a direction toward the upper end thereof to facilitate removal of records from said spindle, and a spindle latch structure positioned between said upper spindle portion and said gate and normally resting in unlatched position to permit said longitudinal movement of said gate but movable to latched position to prevent said longitudinal movement of said gate upon the occurrence of any lateral pressure exerted by a record on said gate.

11. A center post drop spindle of the push-off type for automatic record changers comprising, a bottom spindle portion terminating at its upper end in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle portion including a gate normally positioned adjacent said shoulder for restraining lateral movement of any record other than the lowest record of a stack thereof resting on said shoulder, said gate being movable longitudinally of said spindle and in a direction toward the upper end thereof to facilitate removal of records from said spindle, and a spindle latch structure including a stop fixed with relation to said upper spindle portion and a cooperating stop movable with said gate for preventing said longitudinal movement of said gate upon the occurrence of any lateral pressure exerted by a record on said gate.

12. A center post drop spindle of the push-off type for automatic record changers comprising: a bottom spindle portion terminating at its upper end in a record-supporting shoulder; a push-off finger positioned within said bottom portion adjacent said shoulder and mounted for longitudinal translation and partial rotation to engage the wall of the center hole of a record resting on said shoulder and push it laterally to clear said shoulder; an upper spindle portion including a gate normally positioned adjacent said shoulder for restraining lateral movement of any record other than the lowest record of a stack thereof resting on said shoulder, said gate being movable longitudinally of said spindle and in a direction toward the upper end thereof to facilitate removal of records from said spindle; and a spindle latch structure including a fixed stop on said upper spindle portion, a cooperating stop on said gate, and a spring member for normally biasing said stops laterally apart to a disengaged position to permit said longitudinal movement of said gate while yet permitting lateral movement of said stops to an engaged position upon the occurrence of any lateral pressure exerted by a record on said gate to prevent in said engaged position said longitudinal movement of said gate.

13. A center post drop spindle of the push-off type for automatic record changers comprising, a bottom spindle portion terminating in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle structure including a gate structure normally positioned adjacent said shoulder for restraining lateral movement of any record other than the lowest record of a stack thereof resting on said shoulder, said gate being supported for slight movement laterally of said spindle and for substantial movement longitudinally upward thereof to facilitate removal of records from said spindle, and a stop arranged integrally with one of said structures in cooperative relation to a notch in the other thereof for preventing said longitudinal movement of said gate upon lateral movement thereof occasioned by lateral pressure exerted thereon by a record.

14. A center post drop spindle of the push-off type for automatic record changers comprising, a bottom spindle portion terminating at its upper end in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle portion including a gate normally positioned adjacent said shoulder for restraining lateral movement of any record other than the lowest record of a stack thereof resting on said shoulder, said gate being supported for slight movement laterally of said spindle and for substantial movement longitudinally upward thereof to facilitate removal of records from said spindle, a stop integral with said upper spindle portion in cooperative position with relation to a notch in said gate for preventing said longitudinal movement of said gate upon lateral movement thereof occasioned by lateral pressure exerted thereon by a record, and a spring member for normally biasing said notch out of effective engagement with said stop to permit said longitudinal movement of said gate in the absence of said lateral pressure thereon.

15. A center post drop spindle of the push-off type for automatic record changers comprising, a bottom spindle portion terminating at its upper end in a record-supporting shoulder, a push-off finger positioned within said bottom portion adjacent said shoulder and mounted for longitudinal translation and partial rotation to engage the wall of the center hole of a record resting on said shoulder and push it laterally to clear said shoulder, an upper spindle portion including a gate normally positioned adjacent said shoulder for restraining lateral movement of any record other than the lowest record of a stack thereof resting on said shoulder, said gate being movable longitudinally of said spindle and in a direction toward the upper end thereof to facilitate removal of records from said spindle, and a spindle latch structure positioned between said upper spindle portion and said gate and normally spring biased to an unlatched position to permit said longitudinal movement of said gate but movable against said bias to latched position to prevent said longitudinal movement of said gate upon the occurrence of any lateral pressure exerted by a record on said gate.

MARION J. PIFER.

REFERENCES CITED

The following references are of record in the file of this patent:

UNITED STATES PATENTS

| Number | Name | Date |
|---|---|---|
| 2,355,790 | Faulkner | Aug. 15 ,1944 |
| 2,368,086 | Becwar | Jan. 30, 1945 |
| 2,374,080 | Dale | Apr. 17, 1945 |
| 2,457,106 | Pressley | Dec. 21, 1948 |
| 2,517,630 | Carson | Aug. 8, 1950 |
| 2,523,045 | Miller et al. | Sept. 19, 1950 |